(12) United States Patent
Verma

(10) Patent No.: US 12,280,321 B2
(45) Date of Patent: Apr. 22, 2025

(54) METHOD, PROCESS AND APPARATUS FOR THE VERY LOW TEMPERATURE EVAPORATION SYSTEM

(71) Applicant: Vivek Verma, Mohali (IN)

(72) Inventor: Vivek Verma, Mohali (IN)

( * ) Notice: Subject to any disclaimer, the term of this patent is extended or adjusted under 35 U.S.C. 154(b) by 640 days.

(21) Appl. No.: 17/435,245

(22) PCT Filed: Mar. 13, 2020

(86) PCT No.: PCT/IN2020/050231
§ 371 (c)(1),
(2) Date: Aug. 31, 2021

(87) PCT Pub. No.: WO2020/183498
PCT Pub. Date: Sep. 17, 2020

(65) Prior Publication Data
US 2022/0134251 A1 May 5, 2022

(30) Foreign Application Priority Data
Mar. 14, 2019 (IN) .............................. 201911010031

(51) Int. Cl.
*B01D 1/26* (2006.01)
*B01D 1/28* (2006.01)
(Continued)

(52) U.S. Cl.
CPC ................. *B01D 1/26* (2013.01); *B01D 1/28* (2013.01); *B01D 3/10* (2013.01); *C02F 1/048* (2013.01)

(58) Field of Classification Search
CPC .......... C02F 3/101; C02F 3/107; C02F 3/108; C02F 3/109; C02F 2101/16;
(Continued)

(56) References Cited

U.S. PATENT DOCUMENTS

| 4,769,113 A * | 9/1988 | Sears | F28F 3/083 |
| | | | 159/24.2 |
| 2007/0240446 A1 * | 10/2007 | Holtzapple | B01D 3/065 |
| | | | 62/333 |
| 2016/0220921 A1 | 8/2016 | Kamen et al. | |

FOREIGN PATENT DOCUMENTS

| CN | 1546386 A * | 11/2004 | ................ C02F 1/04 |
| CN | 102060408 B | 6/2012 | |
| EP | 0 780 146 A1 | 6/1997 | |

OTHER PUBLICATIONS

Translation of Ruan (CN-1546386-A) (Year: 2004).*
(Continued)

*Primary Examiner* — Ekandra S. Miller-Cruz
(74) *Attorney, Agent, or Firm* — Ladas & Parry LLP

(57) ABSTRACT

The method, process and apparatus for very low temperature evaporation system novelty of the invention lies in the concept of method, process and apparatus for evaporation and concentration at very low temperature ranges from 5° C. to 80° C. to recover water vapour from liquids or solutions or industrial effluents or spentwash or industrial wastewater or juices or syrups or slurry or sludge or brine or sewer or wastewater or any other evaporative liquid materials in single or multiple effect heat exchanger arranged in horizontal or vertical manner with mechanical vapour compression system under vacuum. This very low temperature evaporation system operates at lowest temperature for maximum clean water recovery from liquids or solutions or industrial effluents or industrial wastewater. The apparatus for low temperature evaporation system eliminates or reduces the utilization of heat generation and rejection units along with other benefits like reduces water extraction from earth and energy losses.

14 Claims, 11 Drawing Sheets

(51) Int. Cl.
*B01D 3/10* (2006.01)
*C02F 1/04* (2023.01)

(58) Field of Classification Search
CPC .............. C02F 2101/30; C02F 2209/02; C02F 2209/08; Y02W 10/10
USPC ........................................................ 210/175
See application file for complete search history.

(56) References Cited

OTHER PUBLICATIONS

ISR for International Application PCT/IN2020/050231 mailed Aug. 10, 2020.
Written Opinion for International Application PCT/IN2020/050231 mailed Aug. 10, 2020.
EP 0780146 A1 dated Jun. 25, 1997 _ English Translation.
CN102060408 B dated Jun. 6, 20212 _ English Translation.

\* cited by examiner

Fig. 1: Front view of vertical low temperature evaporator

Fig. 3: Enlarge top view of compression system of low temperature evaporator

Fig. 4: 3D transparent view of vertical low temperature evaporator

METHOD, PROCESS AND APPARATUS FOR THE VERY LOW TEMPERATURE EVAPORATION SYSTEM

FIELD OF INVENTION

The invention relates to the method, process and apparatus for very low temperature evaporation and concentration system to recover the water vapours from any wastewater solutions or liquids or fluids or industrial effluents or spentwash or industrial wastewater or juices or syrups or slurry or sludge or brine or sewer or wastewater or other evaporative materials at very low temperature difference in vacuum with heat exchanger and mechanical vapour recompression system.

BACKGROUND TO THE INVENTION (PRIOR ART)

In recent years, industries are continuously striving to reduce the energy and water consumption at high temperature. Recovery of clean water vapours from waste liquids or solutions and utilisation of the waste heat in the process is essential for conservation of energy and water in any industry. Evaporation of water vapours from solutions or liquids is the major consumer of energy in any plant at high temperature. A huge scope is there if somehow these water recovery and energy losses can be reduced during evaporation of the waste solutions or liquids. Evaporation is an operation used to remove water from a solution, suspension, or emulsion by boiling off the water using heat energy and concentration of solutions. Evaporation and concentration of liquids are very common processes and equipments in industries for recovery of water vapours and concentration of the solutions by boiling the solutions using heat energy at high temperature and pressure.

According to U.S. Pat. No. 2,732,008A entitled for process of low temperature evaporation is a continuous process for the concentrating of juice at relatively low temperatures comprising forcing a supply of juice at about room temperature as a film over a heating medium for a period of a few seconds wherein the heating medium has a temperature not greater than about 212° F., discharging the heated juice at a temperature about 45° higher than its initial temperature into a vapor separator, drawing off released water vapor in a generally upward direction, drawing off juice concentrated by extraction of water in a generally downwardly direction, recirculating a portion of said concentrated juice into the incoming juice during passage of the incoming juice to the heating medium and tapping off another portion of the concentrated juice when the concentrate reaches a predetermined degree of concentration.

EP0780146, the steam-heated evaporator or thickener is especially suitable for sea water or sugar beet juice. Its plate heat exchangers accept pre-distributed fluid flow from above, which falls as a film on the inner surfaces of vertical channels within, hence being heated in cross- and countercurrent flow.

Patent No. US 20070151840A1 entitled 'Method and device for treating water' is a multi-effect falling-film evaporator, purified water for special purposes. In each effect, a steam phase and water phase is produced from the feed water. The steam phase is used for heating in the subsequent effect, whereby it condenses to product water, and the water phase becomes the feed stream for the subsequent effect.

U.S. Pat. No. 699,038A entitled 'Multiple Effect' relates "to improvements in multiple effects for the evaporation or concentration of liquids or solutions in which the vapor of each preceding effect is used for the further evaporation in each succeeding effect.

Indian Patent Application No. 2319/DEL/2012 and 2468/DEL/2013 suggests that a heat exchanger assembly and modular evaporator comprising of heat exchange plate packs modules and entrainment separator arranged horizontally and vertically in a novel configuration forming a unique multi effect evaporator. The modular heat exchanger assembly is arranged for expanding heating surface by joining each module or more modules in series or parallel combinations for expanding in the same effect or in series or parallel combinations for additional effects without use of vapour lines.

The arrangements described in the prior art, the concentration of liquids suffer from the following disadvantages:
1. Need of boiler for steam generation.
2. Need of cooling tower, condenser and other heat rejection units.
3. Fuel requirement for firing into the boiler for steam generation.
4. Higher energy consumption.
5. Fast scaling of evaporation heating surface due to high temperature operation.
6. Higher intake water from earth.
7. Higher foot print area requirement.
8. Higher operating and maintenance cost.

The energy and water requirements are reduced by providing the evaporation and concentration at lowest possible temperature differences under the vacuum.

The present invention obviates the drawbacks of the prior art by providing a novel approach for processing the evaporation at very low temperature difference based on heat exchanger and mechanical vapour recompression technology with minimum electrical energy consumption. This process operates at very low temperature and pressure differences. The low temperature water vapour generated during evaporation and concentration of the liquids or solutions by heat exchanger is recompressed by mechanical vapour recompression to raise the temperature of vapours for further utilization into evaporation in a closed loop under vacuum. The present invention is directed to providing a novel and unique process of low temperature evaporation comprising heat exchanger and mechanical vapour recompression are arranged in a specific synergistic arrangement, results in a complete process for evaporation and concentration system. Such innovative process eliminates the use of boiler, cooling tower, condenser and other heat energy losses in the process resulting in high energy efficiency, compactness of size, better economy of construction, transportation and operation.

OBJECTS OF THE INVENTION

The principal object of the present invention is to provide a novel process of evaporation at low temperature between 5° C. to 80° C. using heat exchanger or plate packs and mechanical vapour compression system for maximum recovery of water vapour from wastewater liquids or solutions or industrial effluents or spentwash or industrial wastewater or juices or syrups or slurry or sludge or brine or sewer or wastewater or any other evaporative liquid materials.

Another object of the present invention is to provide a novel concept for concentration of liquids or solutions or syrups or juices or other substances at low temperature using heat exchanger or plate packs and mechanical vapour compression to recover of water vapours from wastewater liquids or solutions or spentwash or industrial effluents or industrial wastewater or juices or syrups or slurry or sludge or brine or sewer or wastewater or any other evaporative liquid materials.

Yet another object of the invention is to provide an energy efficient process for evaporation and concentration at very low temperature for recovery of water vapours from liquids or solutions or industrial effluents or spentwash or industrial wastewater or juices or syrups or slurry or sludge or brine or sewer or wastewater or any other evaporative liquid materials using heat exchanger and mechanical vapour recompression system.

Yet another object of the invention is to provide an energy efficient method, process and apparatus for evaporation and concentration designed for very low temperature operation ranges in a single or multi-effect plate heat exchanger stages for maximum recovery of clean water from waste liquids or solutions or industrial effluents or spentwash or industrial wastewater or juices or syrups or slurry or sludge or brine or sewer or wastewater or any other evaporative liquid materials.

Yet another object of the invention is to provide an energy efficient method, process and apparatus for further evaporation and concentration designed for very low temperature operation using forced circulation evaporator in a single or multi-effect plate heat exchanger stages for maximum recovery of clean water from waste liquids or solutions or industrial effluents or spentwash or industrial wastewater or juices or syrups or slurry or sludge or brine or sewer or wastewater or any other evaporative liquid materials.

Yet another object of the invention is to provide an energy efficient method, process and apparatus for evaporation and concentration designed for very low temperature operation ranges from 5° C. to 80° C. in a single or multi-effect plate heat exchanger stages arranged in horizontally or vertically or both manners for maximum recovery of clean water from waste liquids or solutions or industrial effluents or spentwash or industrial wastewater or juices or syrups or slurry or sludge or brine or sewer or wastewater or any other evaporative liquid materials

SUMMARY OF THE INVENTION

The novelty of the invention lies in the concept of method, process and apparatus for evaporation and concentration at very low temperature to recover water vapours from liquids or solutions or industrial effluents or spentwash or industrial wastewater or juices or syrups or slurry or sludge or brine or sewer or wastewater or any other evaporative liquid materials in single or multiple effect plate packs heat exchanger arranged in horizontal or vertical manner with mechanical vapour (recompression system under vacuum. This novel idea results in to synergistic beneficial effect that has not been disclosed in the prior art. In the present invention, the very low temperature evaporation system designed to operate at any temperature particularly ranges from 5° C. to 80° C. This low temperature evaporation system operates at lowest temperature deference for maximum water vapours recovery from liquids or solutions or industrial effluents or industrial wastewater or juices or syrups or slurry or sludge or brine or sewer or wastewater or other liquid materials and concentration of the liquids or solutions. The method, process and apparatus for very low temperature evaporation and concentration system eliminates the utilization of boiler, cooling tower, condenser and other heat rejection units along with other benefits like reduces the water extraction from earth, heat losses, reduction in consumption of steam and fuel.

DETAILED DESCRIPTION OF THE INVENTION

The present invention lies in the concept of energy efficient method, innovative process and apparatus for evaporation and concentration at very low temperature between 5° C. to 80° C. to recover water vapours from any type of waste liquids or feed or solutions or industrial effluents or spentwash or industrial wastewater or juices or syrups or slurry or sludge or brine or sewer or wastewater or RO reject concentration or any other evaporative liquid materials in single or multiple effects plate packs heat exchanger arranged in horizontal or vertical or both manners with mechanical vapour re-compression system under the vacuum.

This specific synergistic approach of low temperature evaporation system or spray electrical dehydrator results into the major benefits which are:
  No need of boiler or steam generation unit and heat reject units
  Minimal electric energy demand
  Electrical power consumption lower than any alternative technology
  Recovery of energy in the form of Bio-Gas in case of organic wastewater
  Recovery of nutrients in the form of Bio-Fertilizer in case of organic wastewater
  Up to 99% recovery of water of highest quality from evaporative solution
  Least footprint, closed, compact and environment friendly
  Fully automatic and eco-friendly According to FIG. 1 to FIG. 11, a novel approach for the evaporation and concentration of feed using low temperature evaporation technology arranged in horizontal or vertical manner in single or multi effect stages comprises plate packs heat exchanger and mechanical vapour re-compression system. The innovative method, energy efficient process and modern apparatus for low temperature evaporation and concentration system operates at any temperature ranges particularly from 5° C. to 80° C. The feed is fed in forward or reverse feed manner into the low temperature evaporator in single or multi effects arranged in horizontal or vertical manner as per process demand under the vacuum. The compressed vapour from mechanical vapour compression or blower or booster or mechanical vapour compression fan or other compression devices (MVR system) is fed to first effect to second effect or each effect through the common vapour header to the each plate packs of each effect of low temperature evaporator for maximum water evaporation. The generated vapours with first effect is passed to second effect, and in similar fashion second to third effect and so on and generated vapours from each effect is combined and compressed by compression system (MVR technology). The feed is fed from first effect to second, second to third effect and so on i.e. forward feed manner or it can be in reverse feed manner i.e. from last to first effect as per process requirement. The low pressure water vapours of each effect get condensed while evaporating the feed due plate packs heat exchanger. The concentrate is collected and recycles back to the process again and again for further concentration and then partially continuous or batch type concentrate taken out after maximum concentration. The vapour outlet of each effect is connected with vapour inlet of next effect and so on.

The vapour outlet of last effect or each effect is connected to the mechanical vapour compression system for compression or recompression of vapour to increase vapour temperature to reuse in the process continuously in a close loop. Concentrated liquid is withdrawal as residue in the rejection tank from the last effect with or without use of the batch evaporator or force circulation evaporator. For more concentration of concentrate, forced circulation evaporator or batch pan or both can be used in single or multiple effects arrangements. This residue can be further converted into bio-gas, bio-energy, bio-fertilizer, CNG.

Present invention enables the low temperature evaporation system, evaporation of water vapours from feed operates at any temperature particularly from 5° C. to 80° C. with minimum electrical demand in a closed loop by utilising the enthalpy of low temperature vapours. This low temperature evaporation maximise the water recovery from any type of feed; reduces inversion, scale & smell formation, colour formation, chemical requirements.

Benefits:
- No need of steam generation unit, heat reject units & chemicals
- Minimal electric energy demand
- Electrical power consumption lower than any alternative technology
- Recovery of energy in the form of Bio-Gas in case of organic wastewater
- Recovery of nutrients in the form of Bio-Fertilizer in case of organic wastewater
- 90-99% recovery of water of highest quality
- Decentralized water recycling solution
- Small footprint, closed, compact and environment friendly
- Automatic system Suitable for integration with district cooling, heating and recovery of deficit water to make zero fresh water intake and zero liquid discharge for maximum recovery of waste vapour lost in conventional process and use for further application till the lowest possible sink temperature which further provides many other additional advantages.

NUMBERING DETAILS

Figure 1:
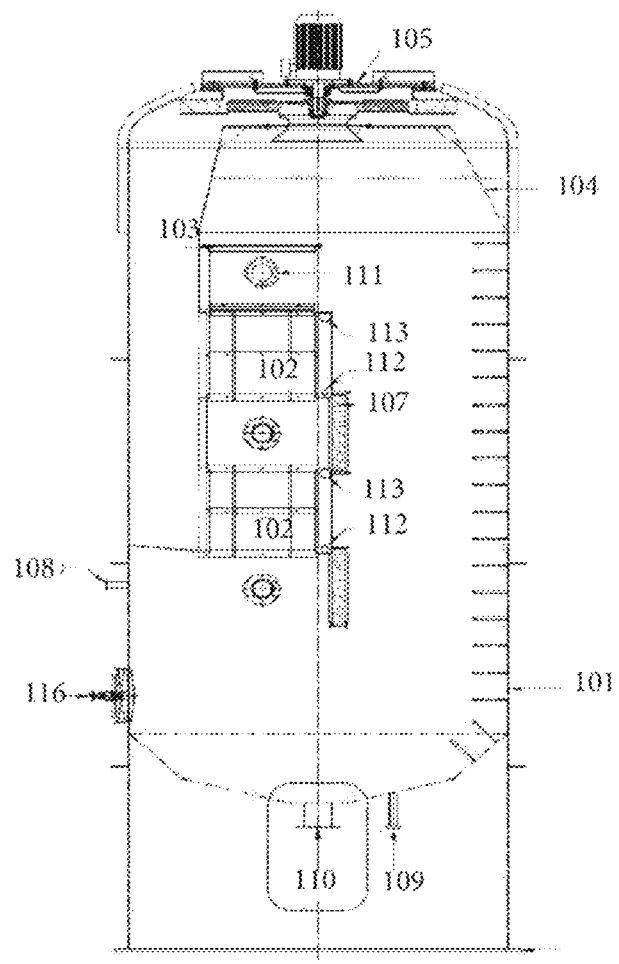
FIG. 1: Front view of vertical low temperature evaporator
Figure 2:
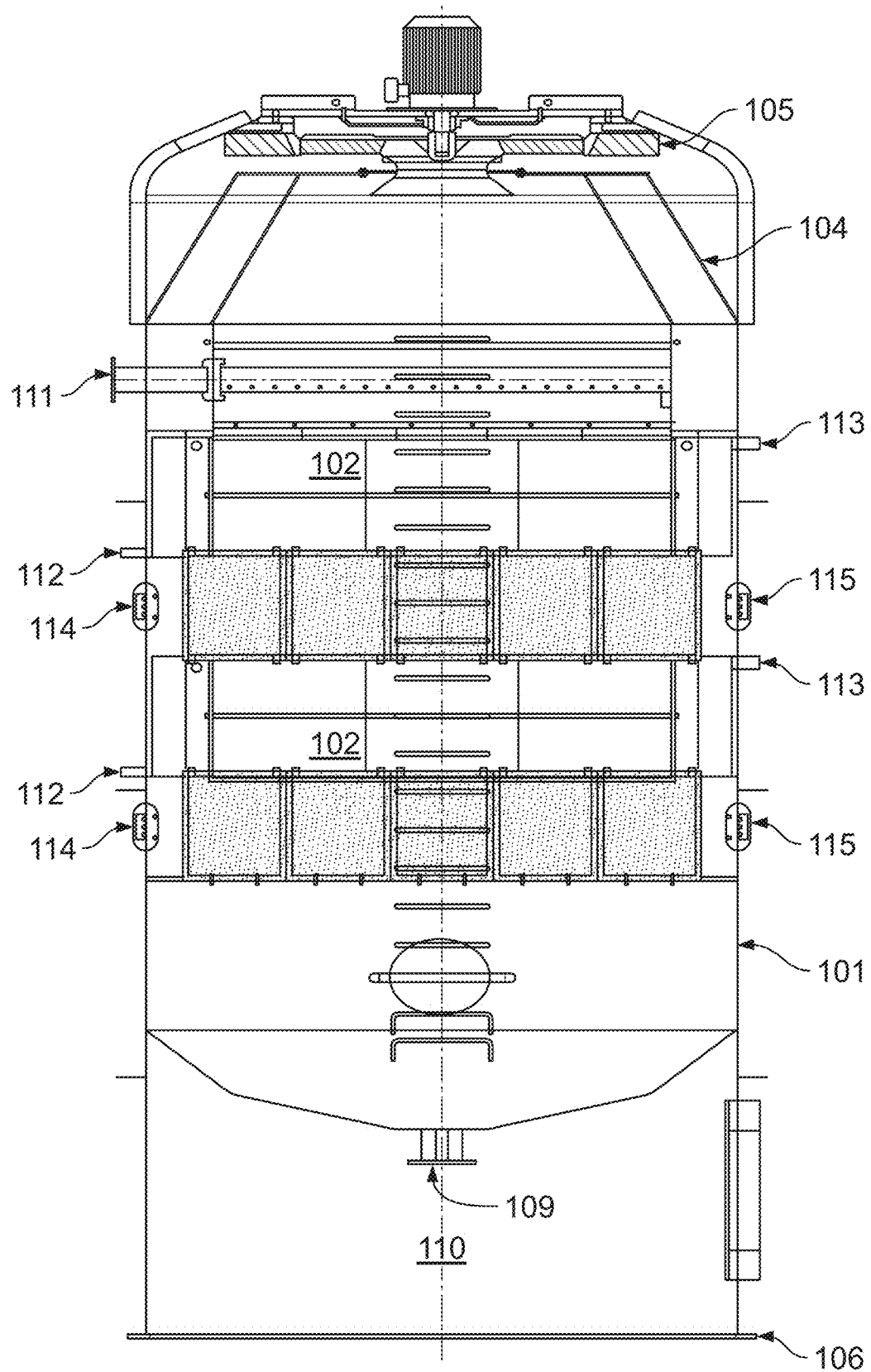
FIG. 2: Enlarge front view of vertical low temperature evaporator
Figure 3:
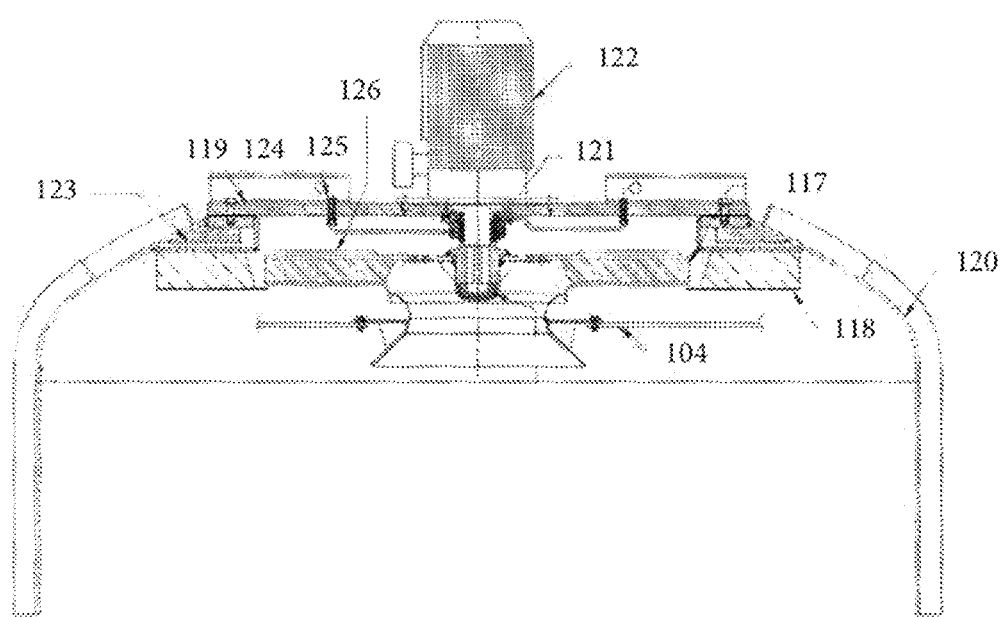
FIG. 3: Enlarge top view of compression system of low temperature evaporator
Figure 4:
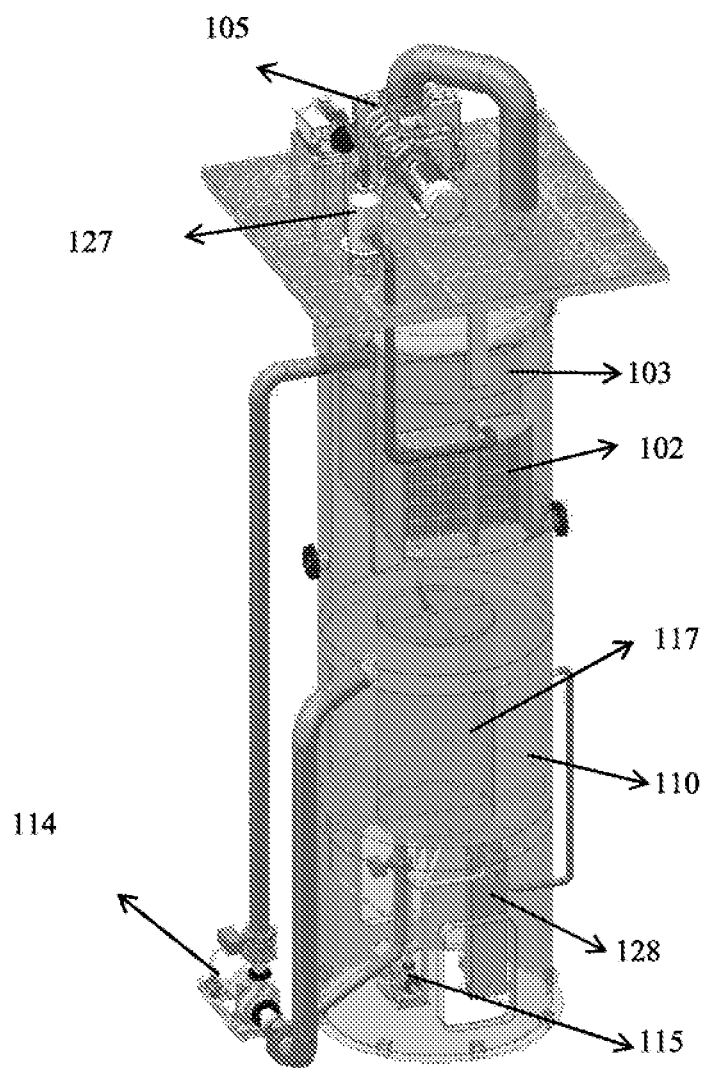
FIG. 4: 3D transparent view of vertical low temperature evaporator
Figure 5:
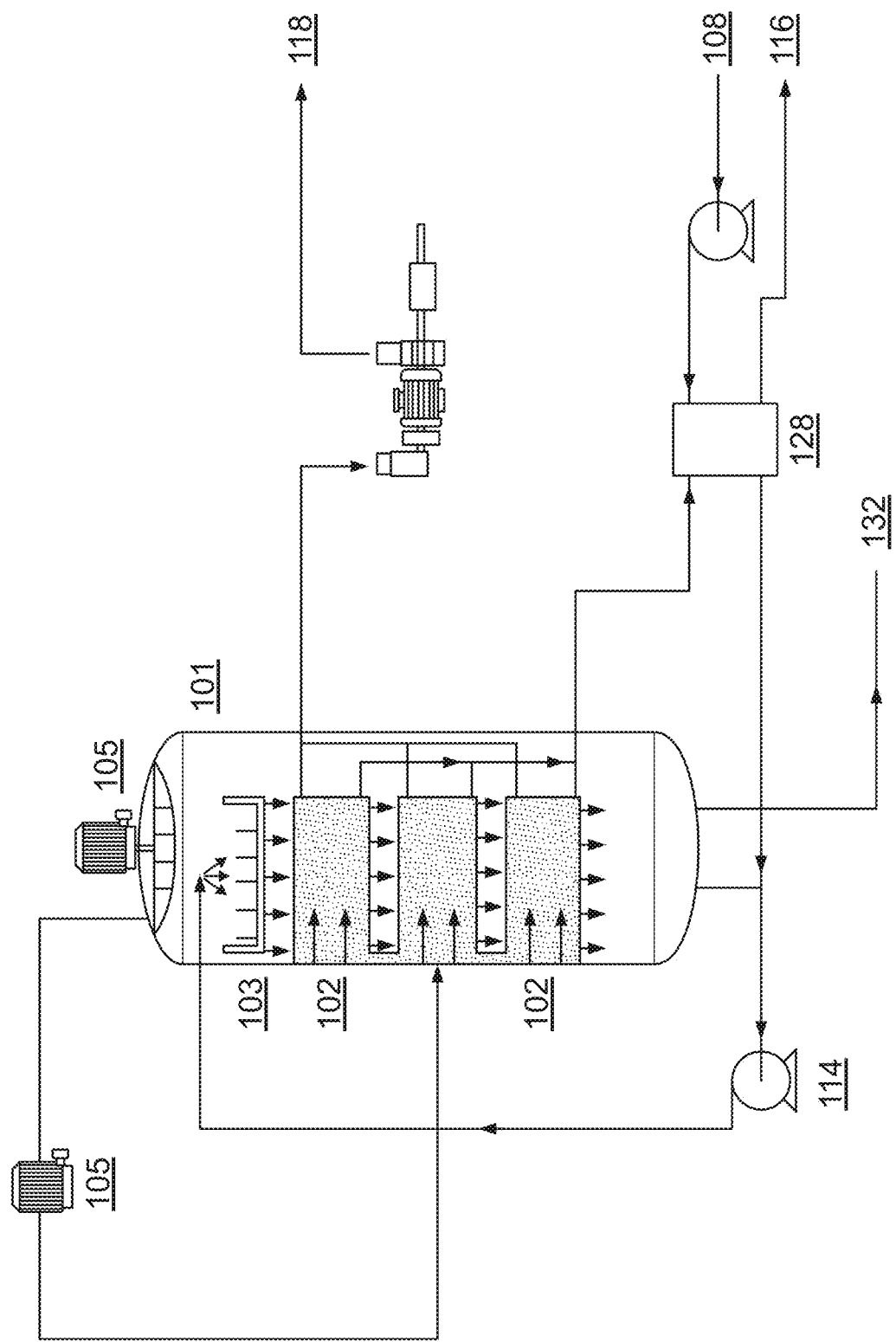
FIG. 5: Schematic diagram of vertical low temperature evaporation system
Figure 6:
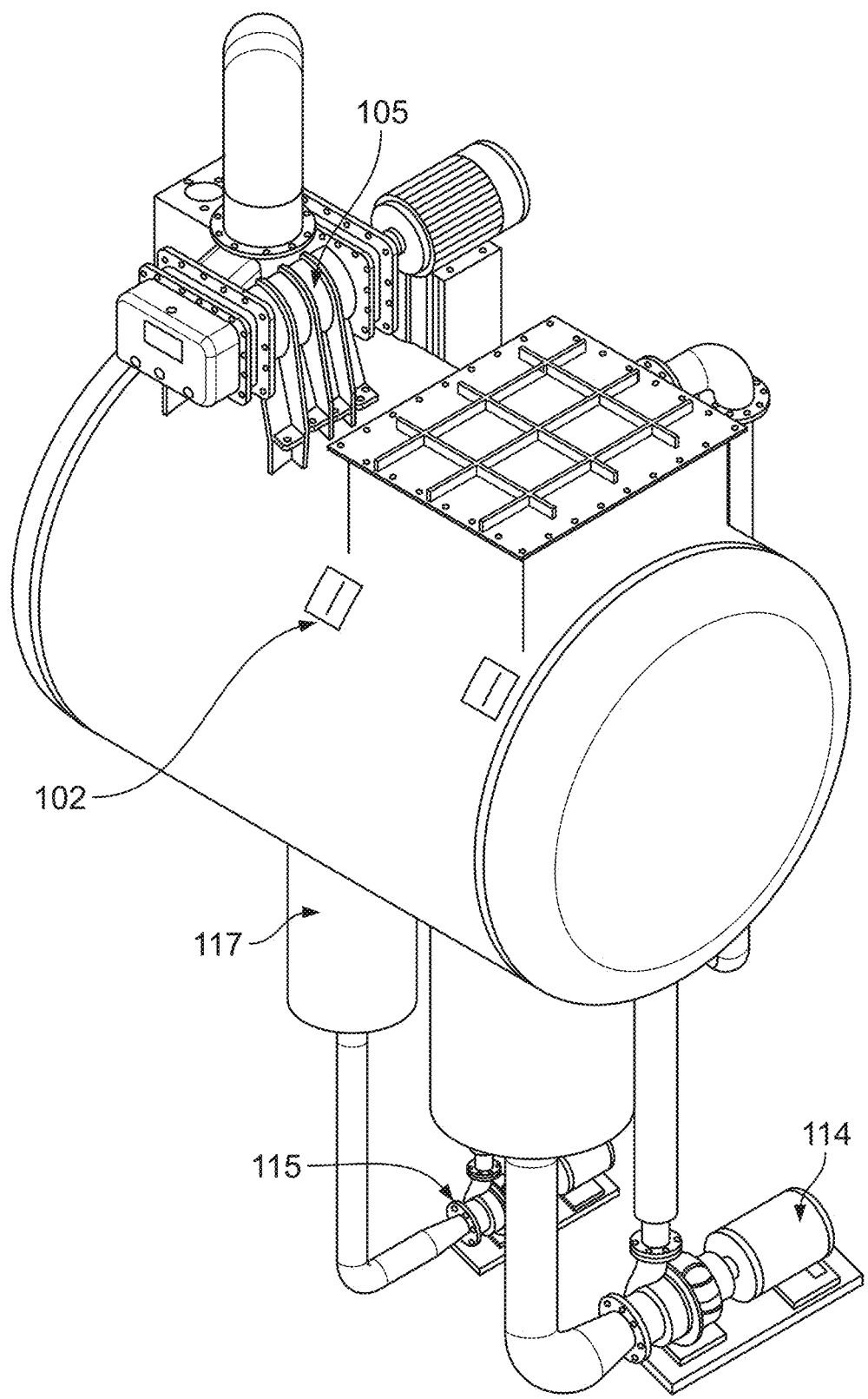
FIG. 6: Isometric view of horizontal single effect low temperature evaporator
Figure 7:
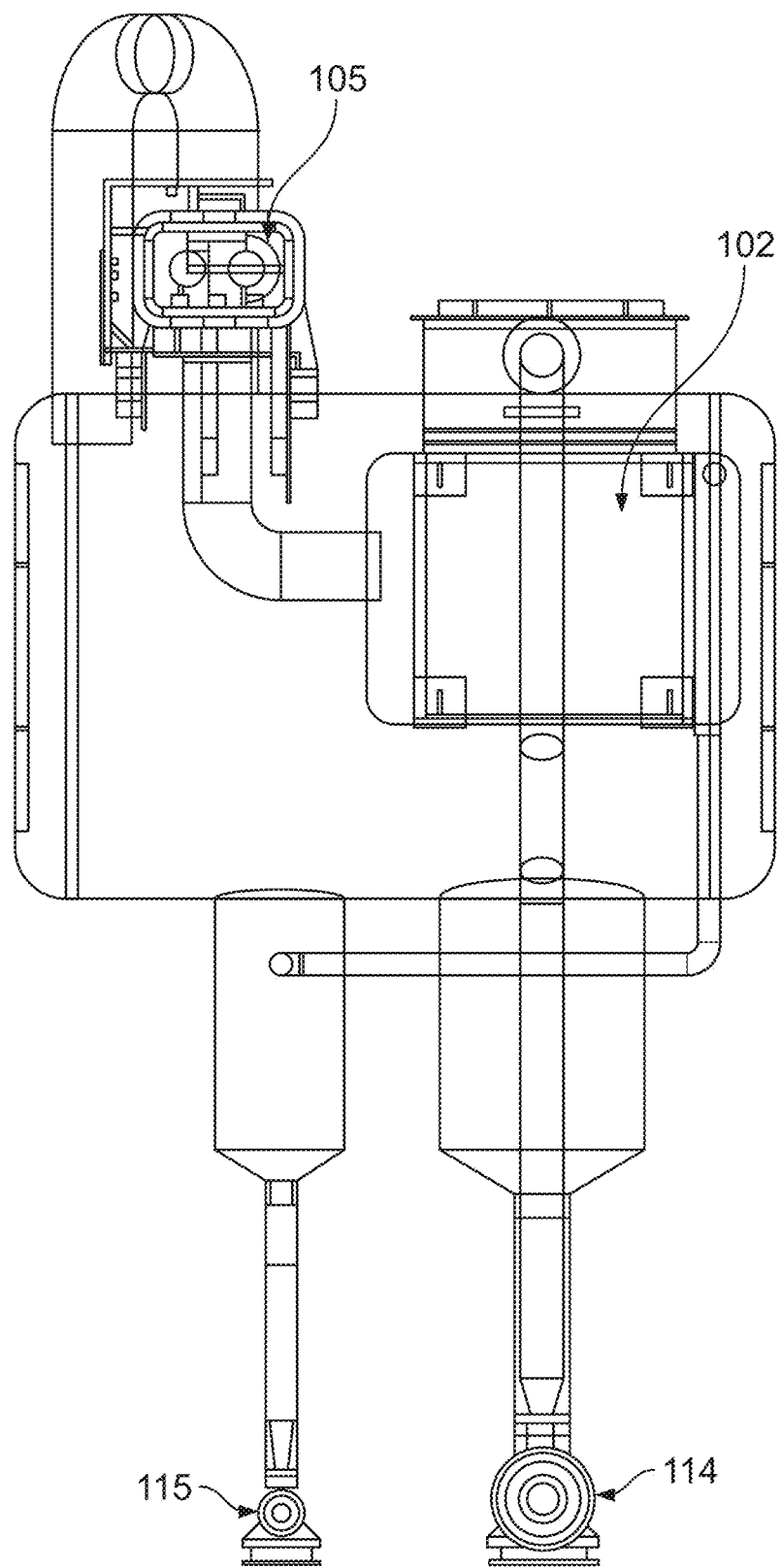
FIG. 7: Front view of horizontal single effect low temperature evaporator
Figure 8:
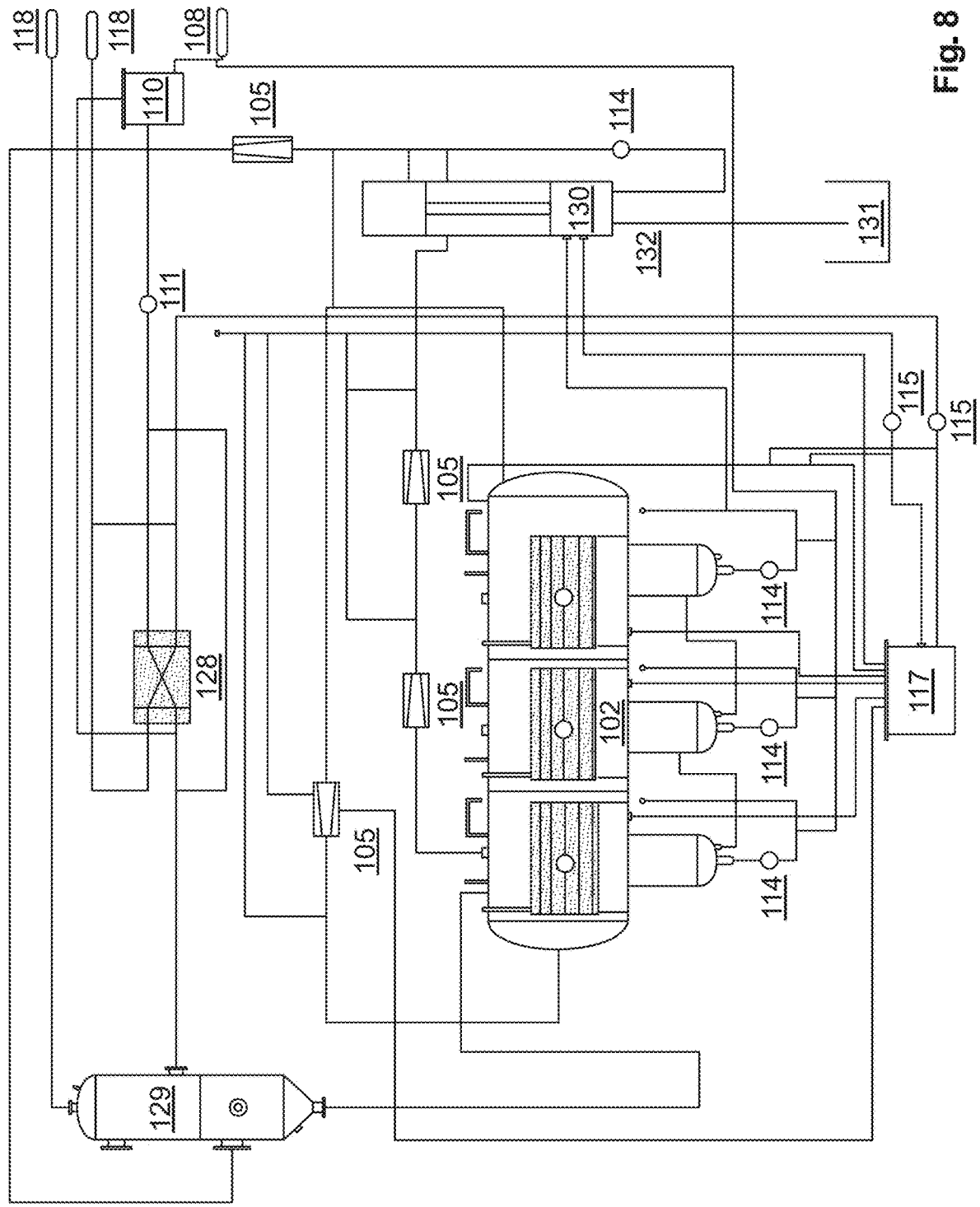
FIG. 8: Process flow of horizontal multi-effect low temperature evaporator
Figure 9:
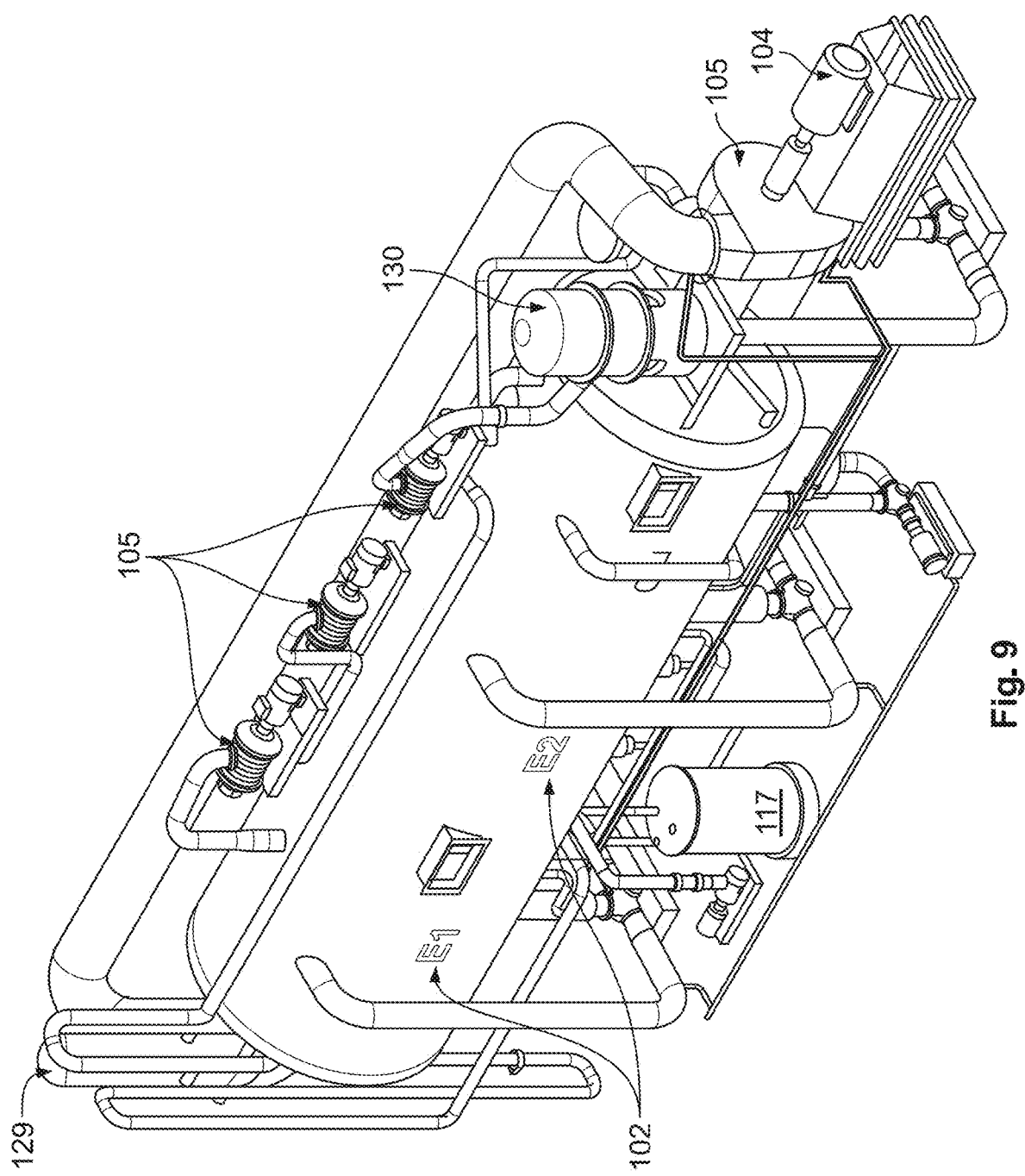
FIG. 9: Isometric view of horizontal multi-effect low temperature evaporator
Figure 10:
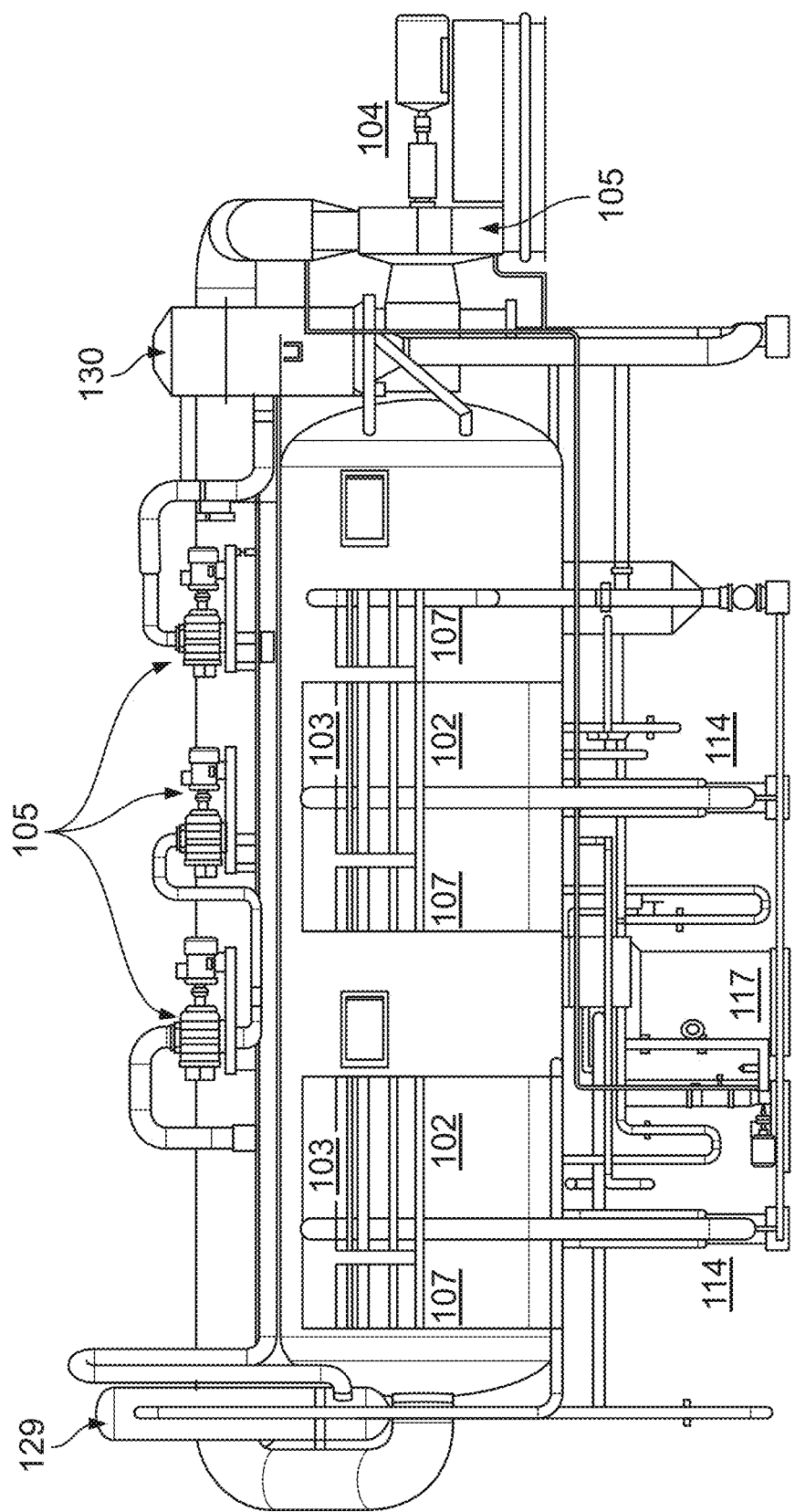
FIG. 10: Front view of horizontal multi-effect low temperature evaporator
Figure 11:
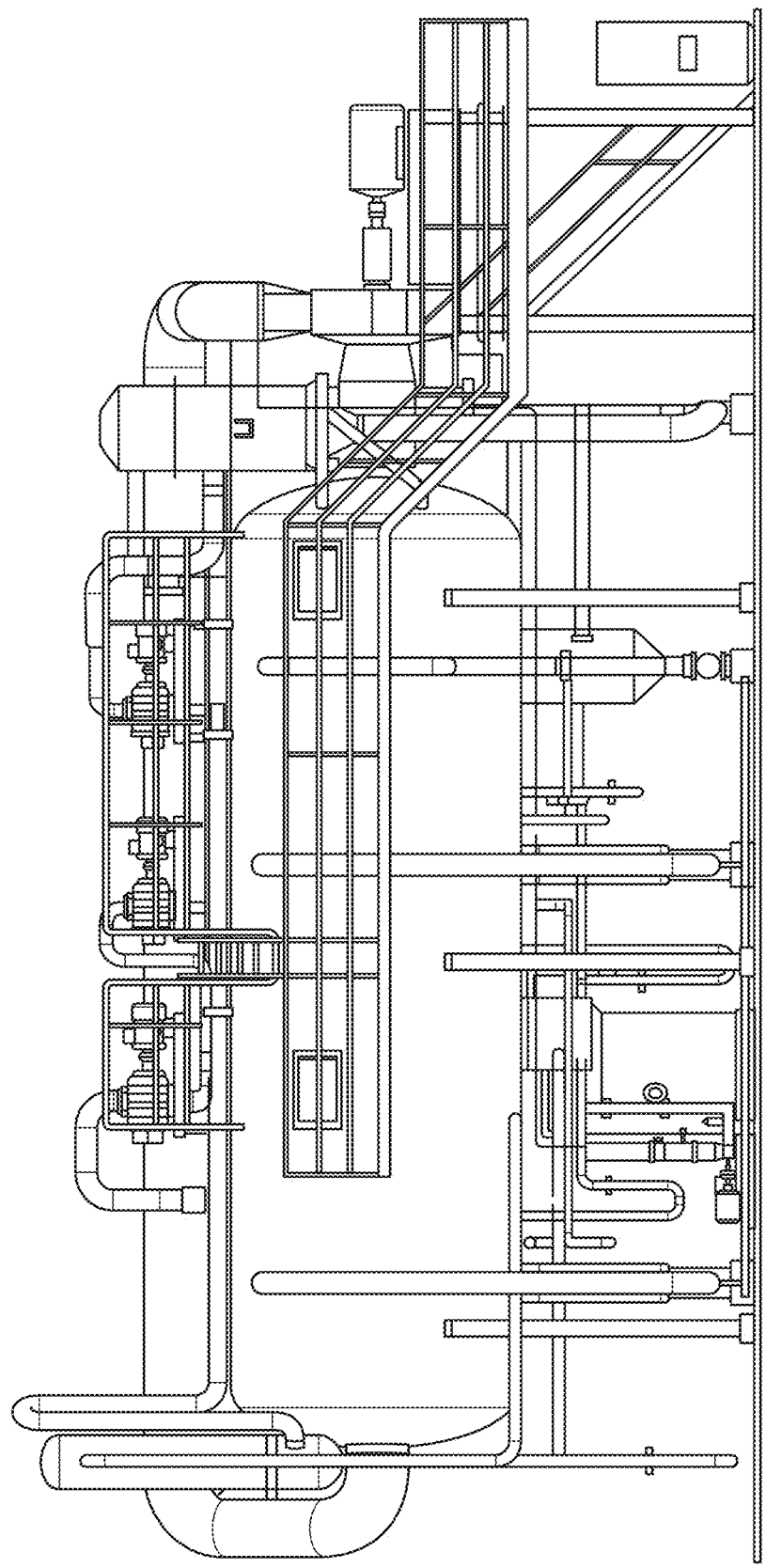
FIG. 11: 3D view of horizontal multi-effect low temperature evaporator

101—Low Temperature Evaporator or Spray Electrical Dehydrator
102—Plate Pack (Plate Heat Exchanger)
103—Distribution Assembly
104—MVR Suction and Delivery Arrangement
105—MVR Booster or MVR Fan or MVR Blower or other compression or recompression system
106—Bearing Plate
107—Demister Pad Assembly
108—Feed Inlet
109—Feed Outlet
110—Feed Tank
111—Feed Pump
112—Re-circulation Out
113—Re-circulation In
114—Recirculation Pump
115—Condensate Pump
116—Condensate Outlet
117—Condensate Tank
118—NCG Outlet
119—Sight Glass
120—Light Glass
121—Man Hole
122—Impeller with Hub
123—Diffuser Vane
124—Dish and Flanges
125—Dish End
126—Mechanical Seal
127—Catcher
128—PHE (Plate Heat Exchanger)
129—Direct Contact Heater (DCH)/Stripper Column
130—Batch Evaporator/Force Circulation Evaporator
131—Rejection Tank
132—Residue Described below referring to FIG. 1 to FIG. 11 an innovative method, process and apparatus at very low temperature evaporation is used in recycling of wastewater to clean water at lowest temperature comprises plate heat exchanger or plate packs and mechanical vapour re-compression system arranged in horizontal or vertical manners implementing the process, method and apparatus in accordance with the invention.

DESCRIPTION OF THE PREFERRED EMBODIMENT

The installation shown in FIG. 1 to FIG. 11 comprises of a low temperature evaporator (101) comprises plate packs (102) and mechanical vapour recompression (105) made of an outer stainless steel shell mounted upon a bearing plate (106). The evaporation liquids or solutions or feed or industrial effluents or spentwash or industrial wastewater or juices or syrups or slurry or sludge or brine or sewer or wastewater or any other evaporative liquid materials in single or multiple effect heat exchanger (102) arranged in horizontal or vertical manner with mechanical vapour compression system (105) under vacuum in which feed is conveyed through the feed inlet (108) by feed pump (111) from feed tank (110) to the plate heat exchanger (128). This hot feed is fed to the direct contact heater (DCH)/stripper column (129) and feed to heat by the compressed non-condensate gas or compressed vapours or vapours of the evaporation system or feed can be directly send to the distribution assembly (103) depending upon the types of the feed. After maintaining the certain level of feed in the distribution assembly (103), the feed is sprayed on the plate packs (102) of single or multi-effect stages arranged in horizontal or vertical manner with the help of recirculation pump and then evaporation phenomena takes place due to temperature difference in the feed and inlet compressed vapours which is coming from the MVR suction and delivery arrangement (104) after re-compression by MVR fan (105). The concentrated liquid is collected at the bottom of the low temperature evaporator and recirculated and partially transferred to the next effect for further concentration. After the desired concentration the feed is transferred through the recirculation pump to the force circulation evaporator (130) or batch evaporator in single or multi-effects arrangement for further evaporation and concentration. In the forced circulation evaporator, compressed vapours of MVR fan (105) or non-condensate gas or both have been used as a heating media for further evaporation and concentration. Concentrate is collected in the bottom of the forced circulation evaporator (130) in rejection tank (131) as residue (132) and generated water vapours are passed through the demister pad assembly (107) for separation of vapours and liquids. After condensation of water vapours, clean water is collected at the bottom of each plate pack (102) of low temperature evaporator and forced circulation evaporator along with batch evaporator and taken out through the condensate outlet (116) into the condensate tank (117) by condensate pump (115). The feed collected at the bottom of the low temperature evaporator or spray electrical dehydrator (101) is carried out through re-circulation outlet (112) and sent to the distribution assembly (103) placed on top of the plate pack (102) through re-circulation inlet (113) by recirculation pump (114). The distribution assembly (103) which consists of at least two and ideally three distribution plates that create a constant fluid flow into the plate pack (102) below which is essential in the formation of the liquid failing film effect on the surface of the plates. A distribution assembly (103) of demister pad (107) are fitted as a vapour-liquid separator which helps to enhance the removal of liquid droplets entrained in the vapour stream. Condensate outlet (116) and NCG outlet (118) are used to continuously remove the condensate and other non-condensable gases through the catcher (127) from the low temperature evaporator (101).

A sight glass (119), a light glass (120) and a manhole (121) are fitted for the easy monitoring and maintenance of the low temperature evaporator (101). The installation of FIG. 3 which depicts the MVR arrangement (104) with MVR (105) comprises of an impeller (122) mounted with a hub whose purpose of this is to minimize leakage from the discharge side of the pump casing to the suction side. The diffuser vane (123) is attached next to the impeller hub to increase the efficiency of the impeller (122) by allowing a more gradual expansion and less turbulent area. The MVR arrangement (104) is mounted on the dished ends (125) with flanged dish (124) and dish ends (125), with a mechanical seal (126) that helps join systems or mechanisms together by preventing leakage and containing pressure attached with the extended shaft of the motor mounted on top of the evaporator, fused with the shell of the low temperature evaporator (101) to avoid any external piping or structure, with opening for water in/out for the cooling of the motor and MVR arrangement (104).

What is claimed is:

1. A low temperature evaporation system for extracting water from a liquid at a temperature between 5° C. to 80° C., comprising: a plate heat exchanger; a direct contact heater or stripper column; a circulation pump; a condensate pump; a distribution assembly; a heat exchanger module comprising a plurality of heat exchanger plate packs; a mechanical vapor compression system comprising one or more compressors; and a forced circulation evaporator or concentrator; wherein: the plate heat exchanger is configured to receive an intake of said a liquid from a feed tank through a feed pump and increase temperature of the liquid; the direct contact heater is configured to receive the heated liquid from the plate heat exchanger and increase temperature of the liquid; the circulation pump is configured to transport the heated liquid from heat exchanger plate packs of the heat exchanger module to the distribution assembly; the condensate pump is configured to transport the condensate of condensate tank collected from heat exchanger module and forced circulation evaporator to the plate heat exchanger; the distribution assembly is configured to distribute the heated liquid over the heat exchanger plate packs of the heat exchanger module; the heat exchanger module is configured to cause water in the heated liquid to evaporate as a vapor and condensate as a water, so that the heated liquid concentrates; the mechanical vapor compression system is configured to compress the vapor or non-condensate gases (NCG), and send the compressed vapor and NCG to the heat exchanger module; forced circulation evaporator and direct contact heater for heating, evaporation and concentration of the heated liquid; and the forced circulation evaporator is configured to collect the concentrated liquid from heat exchanger module, and feed the concentrated liquid to the heat exchanger of forced circulation evaporator through the circulation pump for further evaporation of the concentrated liquid, or release the concentrated liquid for further drying; wherein successive evaporations and concentrations of the liquid under vacuum using the compressed vapor or NCG result in recovery of clean water from effluent or wastewater; and wherein the low temperature evaporation system is configured to extract the water from the liquid at temperature between 5° C. to 80° C.

2. The low temperature evaporation system according to claim 1, wherein the plurality of heat exchanger plate packs of the heat exchange module, the distribution assembly and an entrainment separator or demister pad assembly are arranged in a horizontal or a vertical configuration for proper liquid distribution and vapor separation.

3. The low temperature evaporation system according to claim 1, wherein the vapor from the heat exchanger module is compressed by the mechanical vapor compression system, the compressed vapor is fed to the heat exchanger module, and the circulation pump is further configured to transport the concentrated liquid collected from the heat exchanger module to the forced circulation evaporator so that the evaporation of the liquid occurs without use of an external heat source.

4. The low temperature evaporation system according to claim 1, further comprising a direct contact heater or stripper column, configured to further heat the liquid from the plate heat exchanger before the liquid enters the heat exchanger module for improved evaporation and concentration.

5. The low temperature evaporation system according to claim 1, wherein the heated liquid is sprayed over the heat exchanger plate packs of the heat exchange module by the distribution assembly, the concentrated liquid and condensed vapor are collected separately at the bottom of the heat exchanger plate packs, and the concentrated partial liquid is again pumped by the circulation pump over the heat exchanger plate packs for progressive concentrations of the liquid.

6. The low temperature evaporation system according to claim 5, wherein the concentrated liquid of the last effect of heat exchanger module is transferred to the forced circulation evaporator for further evaporation and concentration using compressed vapor or compressed non-condensate gases, so as to make the progressive concentrations energy efficient.

7. The low temperature evaporation system according to claim 3, wherein temperature of the vapor and non condensate gases (NCG) are increased when compressed by the mechanical vapor compression system, and the compressed vapor and NCG of high temperature are fed to the heat exchanger module, forced circulation evaporator and direct contact heater in the process of evaporation and concentration.

8. A process for extracting water from a liquid at a temperature between 5° C. to 80° C. in a low temperature evaporation system, wherein the low temperature evaporation system comprises a plate heat exchanger, a direct contact heater, a circulation pump, a condensate pump, a distribution assembly, a heat exchanger module including a plurality of heat exchanger plate packs, a mechanical vapor compression system including one or more compressors, and a forced circulation evaporator, wherein the process comprises:
the plate heat exchanger receiving an intake of said liquid from a feed tank through a feed pump and increasing temperature of the liquid, the circulation pump transporting the heated liquid from the plate heat exchanger plate packs of heat exchanger module to the distribution assembly;
the distribution assembly distributing the heated liquid to the plate heat exchanger plate packs of the heat exchange module;
the heat exchange module causing water in the heated liquid to evaporate as a vapor and condensate as water, so that the heated liquid concentrates;
the mechanical vapor compression system is configured to compress the vapor or non-condensate gases (NCG), and send the compressed vapor and the NCG to the heat exchanger module;
forced circulation evaporator and direct contact heater for heating, evaporation and concentration of the heated liquid; and
the forced circulation evaporator is configured to collect the concentrated liquid from heat exchanger module, and the concentrated liquid is feed back to the heat exchanger of forced circulation evaporator through the circulation pump for further evaporation of the concentrated liquid, or release the concentrated liquid for further drying;
wherein successive evaporations and concentrations of the liquid under vacuum using the compressed vapor or the NCG result in recovery of clean water from effluent or wastewater;
and extracting the water from the liquid at the temperature between 5° C. to 80° C. in the low temperature evaporation system.

9. The process according to claim 8, wherein in the low temperature evaporation system, the plurality of heat exchanger plate packs of the heat exchange module, the distribution assembly and an entrainment separator or demister pad assembly are arranged in a horizontal or a vertical configuration for proper liquid distribution and vapor separation.

10. The process according to claim 8, wherein the vapor from the heat exchanger module is compressed by the mechanical vapor compression system, the compressed vapor is fed to the heat exchanger module, and the process further comprises: the circulation pump transporting the concentrated liquid collected from the heat exchanger plate packs of the heat exchanger module to forced circulation evaporator, so that the evaporation of the liquid occurs without use of an external heat source.

11. The process according to claim 8, wherein the low temperature evaporation system further comprises a direct contact heater or stripper column, and the process further comprises:
the direct contact heater or stripper column heating the liquid from the plate heat exchanger before the liquid enters the heat exchanger module for better evaporation and concentration.

12. The process according to claim 8, wherein the distribution assembly distributing the heated liquid to the heat exchanger plate packs of the heat exchange module comprises: the distribution assembly spraying the heated liquid to the heat exchanger plate packs of the heat exchange module; wherein the concentrated liquid and condensed vapor are collected separately at the bottom of the heat exchanger plate packs exchangers, and the concentrated liquid is again pumped by the circulation pump over the heat exchanger plate packs for progressive concentrations of the liquid.

13. The process according to claim 12, wherein the concentrated liquid of the last effect is transferred to the forced circulation evaporator for further evaporation and concentration using compressed vapor or compressed non-condensate gases, so as to make the progressive concentrations energy efficient.

14. The process according to claim 10, wherein temperature of the vapor and the NCG is increased when compressed by the mechanical vapor compression system, and the compressed vapor and NCG of high temperature are fed to the heat exchanger module in the process of evaporation and concentration.

* * * * *